United States Patent [19]

Rickards

[11] 4,271,779

[45] Jun. 9, 1981

[54] ANTI-BROACHING SIDEHULL FENCE FOR A SURFACE EFFECT SHIP

[75] Inventor: Michael A. Rickards, La Jolla, Calif.

[73] Assignee: Rohr Industries, Inc., Chula Vista, Calif.

[21] Appl. No.: 39,658

[22] Filed: May 16, 1979

[51] Int. Cl.³ .............................................. B60V 3/06
[52] U.S. Cl. .................................. 114/67 A; 180/127
[58] Field of Search ............... 114/67 A; 180/116–130

[56] References Cited

U.S. PATENT DOCUMENTS

| | | | |
|---|---|---|---|
| 2,322,790 | 6/1943 | Cristadoro | 114/67 A |
| 3,207,113 | 9/1965 | Tattersall | 114/67 A |
| 3,483,839 | 12/1969 | Ford et al. | 114/67 A |
| 3,907,061 | 9/1975 | Chapman et al. | 114/67 A |

Primary Examiner—Trygve M. Blix
Assistant Examiner—Jesus D. Sotelo
Attorney, Agent, or Firm—Patrick J. Schlesinger; Frank D. Gilliam

[57] ABSTRACT

An anti-broaching sidehull fence for a surface effect ship. The surface effect ship includes a central pressurized plenum chamber which is defined by the upper wet deck, forward and stern seals and sidehull fences positioned along the longitudinal sides of the surface effect ship. These sidehulls are configured to provide a seal preventing pressurized gas from escaping from the plenum chamber with minimum water emersion therealong while the surface effect ship is traveling at maximum forward speed.

4 Claims, 14 Drawing Figures

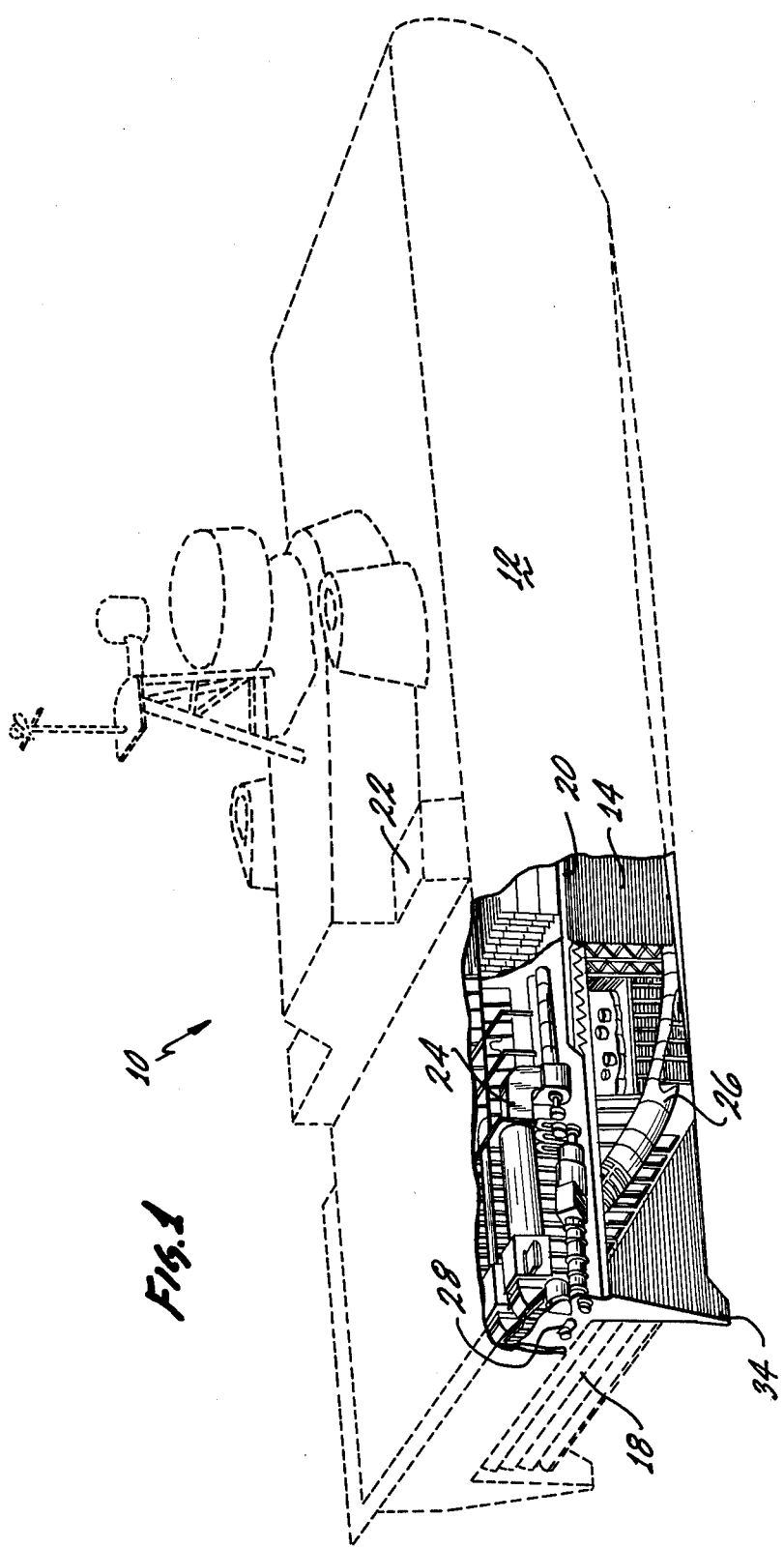

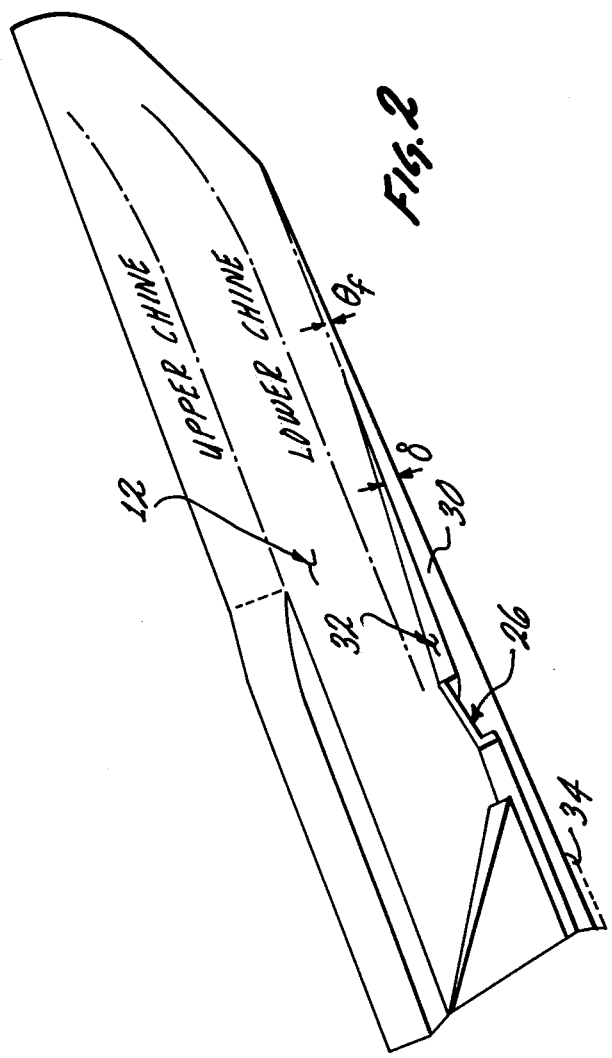
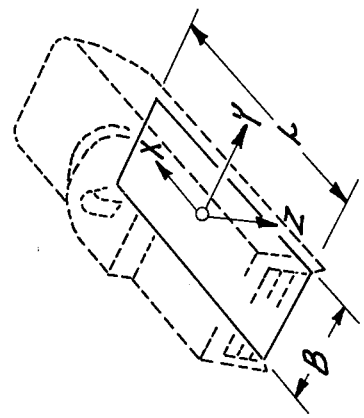
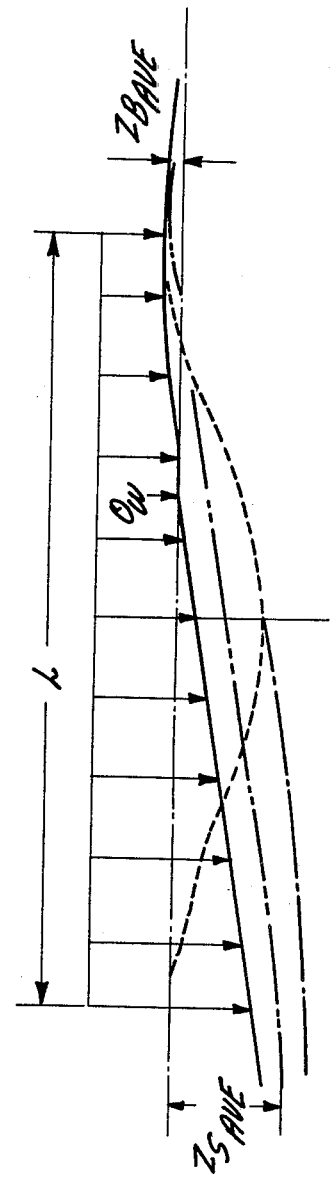

ANTI-BROACHING SIDEHULL FENCE FOR A SURFACE EFFECT SHIP

BACKGROUND OF THE INVENTION

The invention herein described was made in the course of or under a contract or subcontract thereunder with the Navy department.

1. Field of the Invention

This invention relates to surface effect ships and more particularly to improved sidehull plenum chamber sealing with reduced drag characteristics.

2. Description of the Prior Art

It is well known that the maximum speed that may be attained by a surface effect ship is a direct function of the minimum immersion in water that can be achieved by the ship without concomitant degradation of thrust. In the case of surface effect ships that are propelled by partially submerged means, i.e., super-cavitating propellers, minimum immersion is realized by introducing a sufficient volume of air at a suitable pressure into the plenum chamber to maintain a high cushion pressure and thereby provide a minimum immersion of the ship in the water. In this state of minimum immersion, cushion air unfortunately escapes along the longitudinal periphery of the plenum chamber. This is visually evident from the fine spray generated by air escaping at the longitudinal sidehull water interface. An additional problem results when, instead of a propeller, a waterjet propulsion means is employed for propulsion, since the efficiency of the waterjet propulsion means is lowered by air ingestion. The presence of air in the propulsor water stream reduces its propulsion capability when the volumetric ratio of ingested air to water exceeds a nominal value, which has been found to be generally in the order of a few percent. A major source of the excessive air ingestion has been determined to be cushion air escaping along the longitudinal periphery of the plenum chamber commonly referred to as sidewall broaching. This broaching is characteristically pronounced during high ship speeds at very low immersion. A known means for preventing broaching is to hold the immersion of the sidewall to a depth that is consistent with a no-broach condition. Unfortunately this results in increased hydrodynamic drag.

A satisfactory means for preventing broaching, decreasing the sidewall drag and improving inlet efficiency at high craft speeds would find widespread use in the field of surface effect ship technology.

These problems of sidewall broaching, drag and inlet air ingestion problem have not been successfully resolved until the emergence of the instant invention. The invention also has been found to improve the directional stability of a surface effect ship in a state of shallow immersion.

SUMMARY OF THE INVENTION

The instant invention provides an improved sidehull geometry for a surface effect ship which seals the air cushion along its sides, having a minimum of air loss while providing a reduction of hydrodynamic drag while increasing directional stability. This is accomplished by configuring the profile of the sidewall so that it is compatible with the local maximum depression of the water surface at the sidewall water interface for the given surface effect ship geometry and maximum speed capability. This is accomplished by means of an extension of the sidehull surface at the plane of the sidewall (referred to as a fence) according to a mathematical formula, taking into account the length, width and weight of the surface effect ship, the cushion pressure and the desired speed.

A principal object of the present invention is to prevent sidewall broaching at low immersions and trim.

A further object of the invention is to reduce hydrodynamic drag generated by the sidehulls.

A further object of the invention is to increase the thrust in a waterjet-powered craft by improved inlet conditions.

A still further object of the invention is to improve directional stability.

Other objects and advantages of the invention will be evident from the detailed description when read in conjunction with the accompanying drawings.

The foregoing and various other features of the invention will appear in the course of the description which is rendered below with the same reference numerals used throughout the specifications and figures to depict an identical element or part.

BRIEF DESCRIPTION OF THE DRAWINGS

FIG. 1 is a partial cutaway perspective showing of a surface effect ship, including the sidewall appendage (fence) of the instant invention.

FIG. 2 is a side view of a surface effect ship having a sidewall embodying the instant invention.

FIG. 3A is a diagrammatic showing of general water surface related geometry for a sidewall of the instant invention.

FIG. 5 is a side view of FIG. 4.

SUMMARY OF NOTATIONS EMPLOYED

B  Air plenum (cushion) beam (FT)

Required depth of the instant invention at midcushion relative sidehull keel plane (FT)

Figure 4:
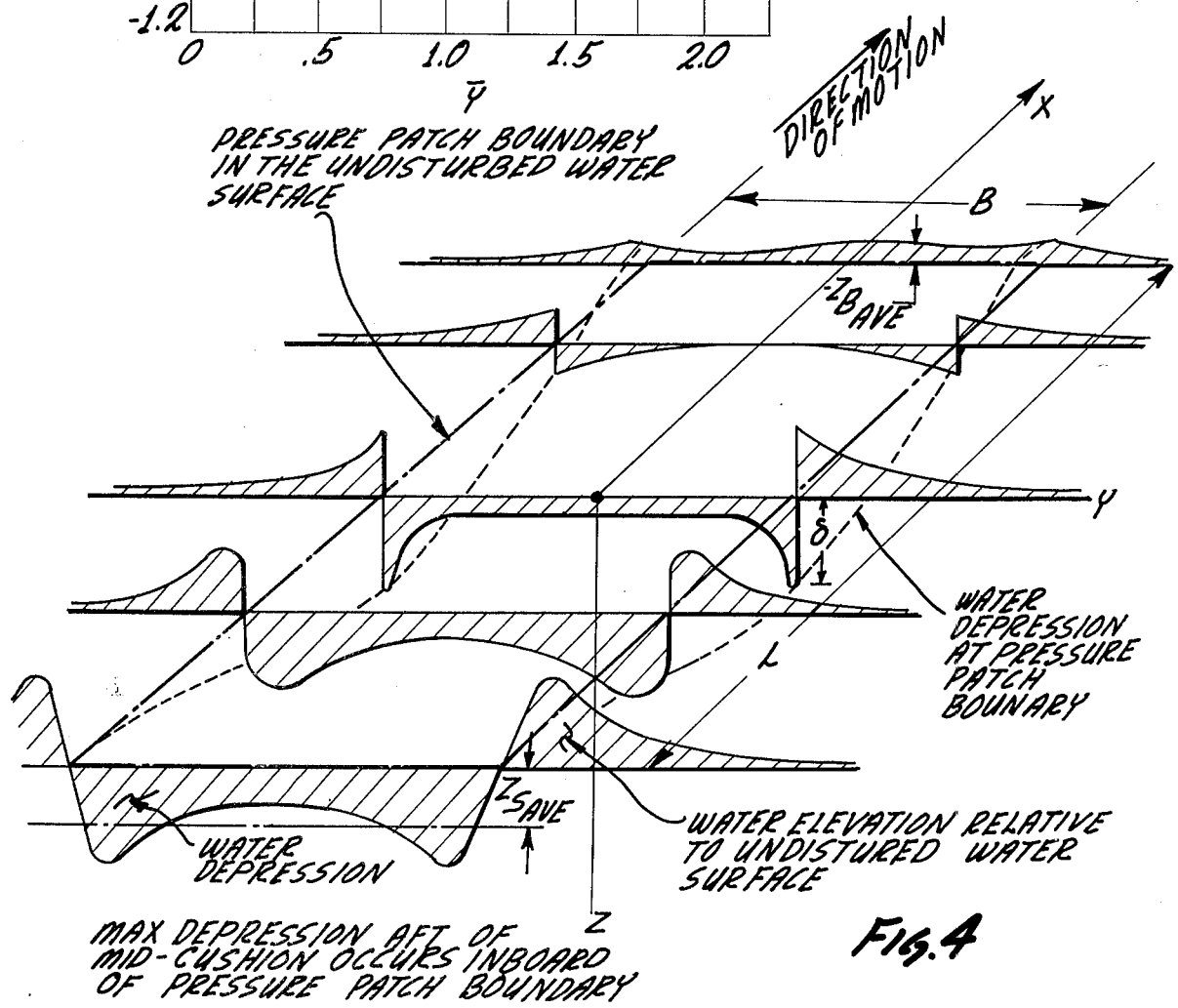
FIG. 4 is a perspective diagrammatic view showing of the pertinent water surface interface criteria associated with sidewalls of surface effect ships.

- g   Acceleration of gravity = 32.174 (FT/SEC$^2$)
- L   Air plenum (cushion) length (FT)
- P   Air plenum (cushion) pressure (PSFG)
- R   Wave making resistance (wave drag), (LBS)
- V   Ship speed (FPS)
- X   Reference axis in the direction of motion with the origin at the center of pressure of the cushion planform area (mid-cushion for a rectangular pressure patch), as shown in FIG. 4, (FT)
- Y   Reference axis in the athwartships direction with the origin at mid-beam as shown in FIG. 4, (FT)
- Z   Reference axis in the direction of gravity with the origin at the center of pressure of the cushion planform area, at the undisturbed water level, as shown in FIG. 4, (FT)
- $Z_B$   Elevation of water surface at the upstream (forward) boundary of the air plenum (cushion). This corresponds to the bow seal, water surface interface, as shown in FIG. 4, (FT)
- $Z_S$   Depression of the water surface at the downstream (rearmost) boundary of the air plenum (cushion) in the mid-beam (Y-0) location, as shown in FIG. 4, (FT). This corresponds to the stern seal trailing edge.
- $\theta_W$   Average wave angle as shown in FIG. 5, (Radians)
- $\theta_f$   Required forebody angle of the instant invention relative to the sidehull keel plane as shown in FIG. 2, (Radians)
- $\rho$   Density of water = 1.99 (Slugs/FT$^3$)

PERTINENT DIMENSIONLESS PRODUCTS

- C   Resistance (wave drag) coefficient $\equiv (\rho g R/P^2 B) = (\rho g/P)(Z_{Save} - Z_{Bave})$
- $\delta$   Required dimensionless depth of instant invention $= \rho g/PC$
- F   Froude Number based on the cushion length
- $F_H$   Froude Number at primary hump
- $\overline{X}$   Dimensionless longitudinal distance
- $\overline{Y}$   Dimensionless lateral distance
- $\overline{Z}$   Dimensionless depression of the water surface
- $\overline{\theta}_T$   Required dimensionless trim angle of instant invention
- $\overline{\theta}_W$   Dimensionless wave angle
- ( )$_{ave}$   Pertains to the average value of ( ) across the beam

DETAILED DESCRIPTION OF THE PREFERRED EMBODIMENTS

The invention pertains to a unique sidewall shape for a surface effect ship that has maximum vertical dimensions at substantially midship that can be readily calculated from various parameters. Studies have been made to determine the shape of the depression within the air cushion as well as to determine the area along the cushion most susceptible to sidewall broaching. Notable studies in the field are Huang, Wong and Webster, authors of Journal of Ships' Research, September, 1970, pages 195-203, and Newman and Poole in Schiffstechnils Bd. 9-1962-Heft 45.

These and other studies have determined that there is a considerable depression of the free water surface inboard of the sidewall and a considerable elevation of the water surface outboard of the edge of the pressure distribution with the maximum depression of the free surface at the sidewall occurring at approximately midship.

Experimental studies conducted in tow basins further indicate that the area most susceptible to sidewall broaching, given a flat keel shape, also occurs midship. It has also been found that the depression of the free surface at the sidewall departs considerably from classical wave angle theory adjacent to the sidewalls. The average wave angle, however, has been found to still satisfy classical wave angle theory.

Referring to the drawings and to FIG. 1 in particular, a surface effect ship constructed in accordance with the present invention is generally designated by the reference character 10.

A surface effect ship 10 has a sidehull 12, which has a sidewall configured to a specific shape arrived at by the formulation of the ship characteristics as hereinafter discussed. The ship 10 is supported by a cushion of air 14 located beneath the center of the ship. The cushion plenum is formed by two sidehulls 12, the bow seal 16, the stern seal 18, the wet deck 20 and the water surface. Cushion air is maintained by a lift system (not shown) well known in this art that pumps air from air inlets 22 under elevated pressure to the cushion plenum. The ship of the preferred embodiment is propelled, for example, by a waterjet pump 24 shown having a source of water from pump input nozzle 26 which is exited through the nozzle 28.

FIG. 2 is a showing of the sidehull 12 including the anti-broaching fence 30 shown as an appendage to the sidewall surface. The sidewall forms the inboard plenum surface. The anti-broaching fence 30, heretofore referred to as the fence, forms a barrier between the central plenum chamber cushion air and the waterjet inlet 26. The dimensions consisting of a characteristic forebody angle $\theta_f$ and depth $\delta$ relative to the sidewall keel plane 32 according to specific formulation of the ship characteristics. The characteristic depth $\delta$ is located at mid-cushion (X=0) and at the sidewall surface (Y= ÷B/2). The port and starboard sidehulls are symmetrical about the centerline (Y=0). Fence geometry aft of the midship location (x<0) is dictated by ship stability, with particular consideration to the fence depth at the directional stablizer 34 (also see FIGS. 9B and 10A). The leading consideration for the fence configuration aft of mid-cushion is that it have sufficient depth to cover the local water depression at the sidewall surface but deeper than the waterjet inlet 26, whichever condition governs. The leading consideration for linearized fence design forward of mid-cushion is the depth $\delta$ and forebody angle $\theta_f$ necessary to cover the local water depression at the sidewall surface. In general, the leading consideration for the fence design is compliance with the broach contour at the sidewall-/water interface.

Figure 3B:
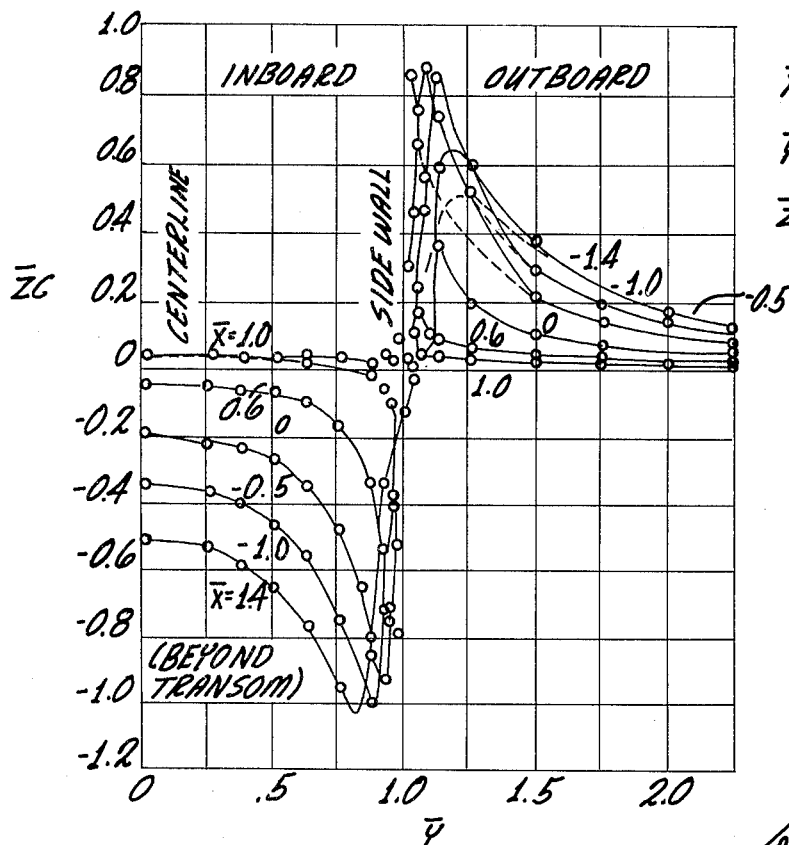
FIG. 3B is a graph presentation of typical lateral and longitudinal distribution of the water surface within the cushion at high Froude Numbers.

Referring now specifically to FIGS. 3A and B. The depression profile at high speeds is typically represented in FIG. 3B for a length-to-beam ratio, L/B, of 2.5, and a Froude Number 2.12 (Reference Journal of Ship Research, Sept. 1970, Pages 195-203). The maximum depression adjacent to the pressure boundary, sidewall, is seen to occur at mid-cushion. Whereas the maximum depression continues to increase aft of the mid-cushion, the peak depression occurs inboard of the sidewall.

A diagrammatic showing of the waterline contour for post primary hump conditions is shown in FIG. 4.

The pertinent geometry of the water surface, depressed by the action of a moving pressure patch, is shown in FIG. 5 relative to the undisturbed water surface. The water elevation at the leading edge of the pressure patch $Z_B$, is constant nearly across the beam, the magnitude of which is dependent upon ship geometry and Froude Number. At mid-cushion, the water depression intensifies as it approaches the sidewall, which exhibits the maximum depression $\delta$. Progressing rearward from mid-cushion, the maximum depression occurs inboard of the sidewall. At the sidewall surface, the depression recedes to the point at which the water level is actually located above that exhibited by the centerline depression.

The average wave angle $\theta_w$ is defined by the chord length bounded by $Z_{B_{ave}}$ at the bow and the $Z_{S_{ave}}$ at the transom and may be expressed as:

$$\theta_w = (Z_{S_{ave}} - Z_{B_{ave}})/L$$

The resistance coefficient C, from the classical hydrodynamic theory is:

$$C = (\rho g R/P^2 B) = (\rho g L/P) \theta_w$$

The resistance coefficient C is a dimensionless representation of the average wave angle $\theta_w$.

Figure 6:
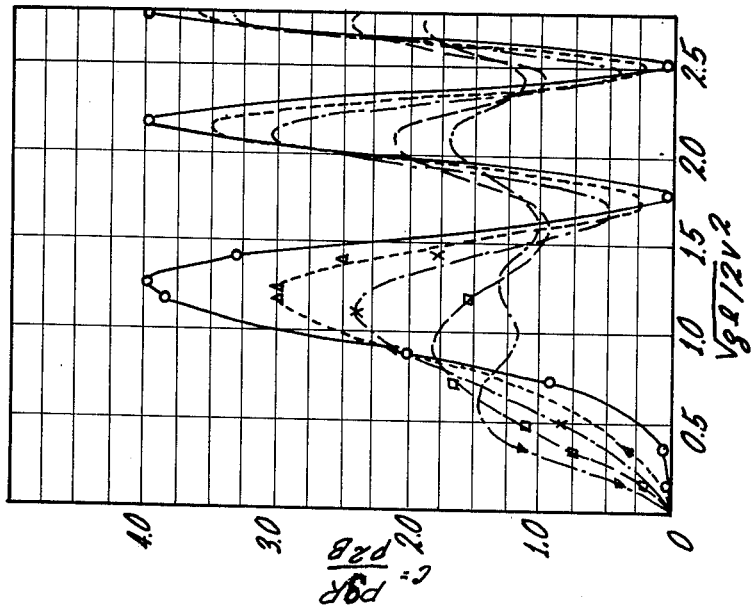
FIG. 6 is a graph illustrating the resistance coefficient C versus Froude Number and cushion length-to-beam ratio.

The FIG. 6 shows the variations between the resistance coefficient C, Froude Number and cushion length-to-beam ratio L/B. The first peak represents the primary hump condition.

For high ship speeds, the Froude Number F is greater than that exhibited at primary hump. This is primarily the region of interest wherein the anti-broaching characteristics of the anti-broaching fence 30 is called for, in particular, the maximum speed of the craft. In configuration of the anti-broaching fence 30 is the determination of the resistance coefficient C and average wave angle $\theta_w$ employing the following empirical equation:

$$C = Ak \sin^2\left(\frac{\pi}{2}\left(\frac{F_H}{F}\right)^{k/2}\right) \qquad \text{Eqn. A}$$

where:

$$k = 3\cos\left(\frac{L/B}{\sqrt{\frac{1}{\pi}} + \frac{2}{\pi}(L/B)}\right) + 1 \qquad \text{Eqn. A1}$$

$$F_H = 0.025(L/B)^{\pi/2} + \sqrt{\frac{1}{\pi}} \qquad \text{Eqn. A2}$$
$$= \text{Primary hump Froude Number}$$

$$A = \pi\left[\left(1 - \left(\frac{F_H}{F}\right)\right)\sin\left(\frac{\pi(L/B)}{L/B + 1}\right)\right] + 1 \qquad \text{Eqn. A3}$$

The numerical representation of equation A is shown in FIG. 6 at the pertinent ranges of the anti-broaching fence 30 and is seen to satisfy a wide range of length-to-beam ratios L/B and post primary hump Froude Numbers F. The average wave angle is determined from:

$$\theta_w = (P/\rho g L) C \qquad \text{Eqn. B}$$

Figure 7:
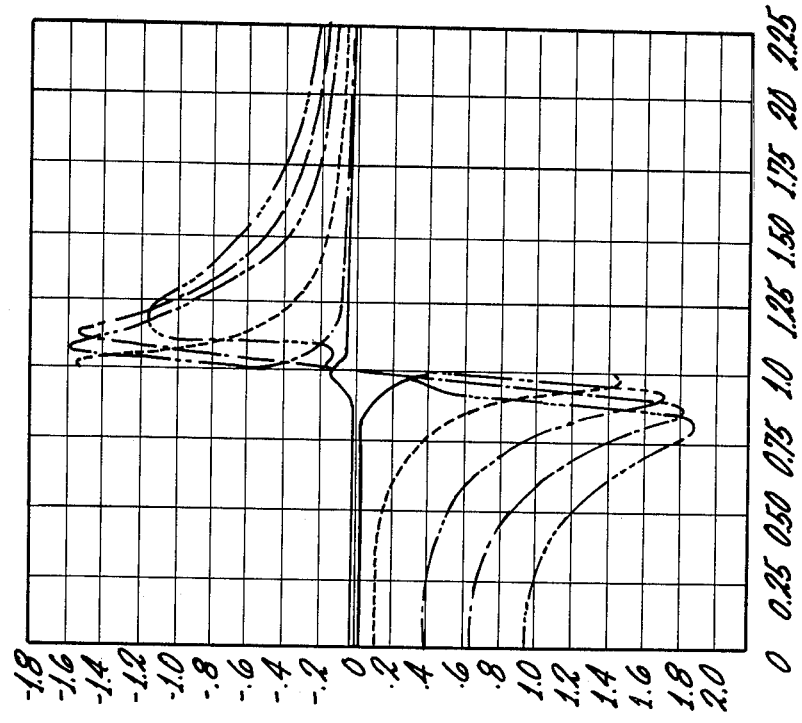
FIG. 7 is a graphical showing of the generalized characteristics of the water depression inside and outside the air cushion (near field).
Figure 8:
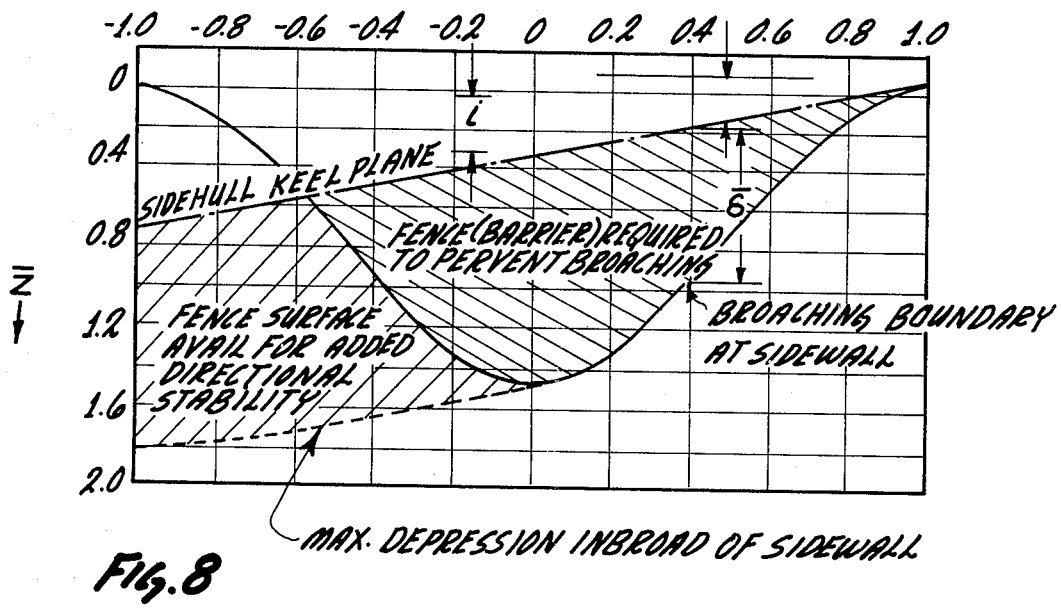
FIG. 8 is a schematic view showing the generalized shaping of the region of broach adjacent to the sidehulls.

A further embodiment of the anti-broaching fence is shown graphically in FIG. 7 which represents a generalized version of FIG. 3B giving the longitudinal and lateral boundaries of the water surface for a wide range of length-to-beam ratios and post primary hump Froude Numbers. The generalized counterpart of FIG. 5, giving the broaching boundary of the water surface at the sidewall interface, is given in FIG. 8. In FIGS. 7 and 8, the origin is taken at the level of the undisturbed water surface, located mid-cushion as shown in FIG. 4. The x, y, z reference coordinates are replaced by their dimensionless counterparts, $\bar{x}, \bar{y}, \bar{z}$ (denoted by a "bar" superscript) defined as follows:

$$\bar{x} = (2x/L) \qquad \text{Eqn. C}$$

$$\bar{y} = (2y/L) \qquad \text{Eqn. D}$$

$$\bar{z} = (\rho g z/Pc) \qquad \text{Eqn. E}$$

where the resistance coefficient C is obtained from Equation A.

The sidehull keel plane 32 at a design trim angle relative to the undisturbed water surface, $\bar{\theta}_T$, is depicted in FIG. 8 by the non-dimensional angle parameter $\bar{\theta}_T$ wherein the following definition applies:

$$\bar{\theta}_T = (\rho g L/2PC)\theta_T \qquad (\theta_T \text{ is in radians}) \qquad \text{Eqn. F}$$

If the trim angle is equal to the average wave angle $\theta_w$, $$\bar{\theta}_T = \bar{\theta}_w = \tfrac{1}{2} \qquad \text{Eqn. G}$$

The equation representing the keel line in FIG. 8 is:

$$\bar{z}_T = (1 - \bar{x})\tan\bar{\theta}_T - 0.08 \qquad \text{Eqn. H}$$

The equation representing the broaching line at the sidehull interface relative to the undisturbed water surface in FIG. 8 is:

$$\bar{z}_{BR} = 0.77\cos(\pi\bar{x}) - 0.04\bar{x} + 0.73 \qquad \text{Eqn. I}$$

The depth of the fence barrier required to prevent broaching, in FIG. 8, is:

$$\bar{\delta} = \bar{z}_{BR} - \bar{z}_T \qquad \text{Eqn. J}$$

where:

$$\bar{\delta} \equiv (\rho g \delta/PC)$$

$$\bar{\delta} = 0.77\cos(\pi\bar{x}) + 0.506\,\bar{x} + 0.264 \qquad \text{Eqn. K}$$

For the minimum drag case in which the trim angle is set to the average angle $(\bar{\theta}_T = \bar{\theta}_w)$.

From the definition of the non-dimensional entries (bar superscripts), the physical dimensions of the broaching boundaries relative to the undisturbed water surface or the reference keel line can be readily obtained by employing equations A through K. For example, a fence designed to a trim angle equal to the wave angle (Equation K), in dimensional terms would have the following broaching boundary with respect to the keel plane:

$$\delta = (PC/\rho g)[0.77\cos(2\pi x/L) + 1.012(x/L) + 0.264] \qquad \text{Eqn. L}$$

where C is obtained from Equation A.

The fence boundaries must cover the above broaching boundaries relative to the keel and any surface extensions beyond this boundary aft of mid-cushion serves to augment to the directional stability of the ship.

In general, the sidehull drag is minimized by aligning the sidehull keel plane 32 (FIG. 2) with the average wave angle $\theta_w$ (FIG. 5). When this is done, the required sealing boundary relative to the undisturbed water surface or the reference keel line is readily obtained from ship geometry and design Froude Number by means of the following mathematical procedure: given a ship weight W, cushion length L, cushion beam B, design ship speed V, and trim angle $\theta_T$, determine:

1. Cushion pressure:

$$P = (W/BL)(1 - F_B)$$

Where: $F_B$ = Percentage of the buoyancy force due to the immersed portion of the sidehull, to the total weight. In general, this parameter is in the vicinity of 0.05%.

2. Design Froude Number:

$$F = \sqrt{\frac{v^2}{gL}}$$

Where: $g$ = The acceleration of gravity = 32.174 ft/sec$^2$

3. Equation A yields the value of the resistance coefficient, C, and the Froude Number at primary hump $F_H$ (available for ensuring that the design Froude Number is greater than $F_H$).
4. From Equations C, D and F or G (if the trim angle desired is the wave angle) obtain the dimensionless parameters $\bar{x}$, $\bar{y}$ and $\bar{\theta}_T$.
5. Equation I provides the dimensionless representation of the broach area relative to the undisturbed water surface, $\bar{z}_B$ as a function of $\bar{x}$. Equation E and C transforms the broach area to dimensional terms, $z_{BR}$ vs. x. This broach area defines the region that must be bound by the fence if broaching is to be avoided. Extensions beyond the region of broach cited are available for generation of hydrodynamic forces necessary for stability and maneuvering.
6. The keel line relative to the undisturbed water surface is obtained in dimensionless terms from Equation H. Equation J provides the depth of the fence barrier beyond the keel line, in dimensionless terms as $\bar{\delta}$ vs. $\bar{x}$. The dimensional equivalent is readily determined as $\delta$ vs. x from Equation C and:

$$\delta = (PC\bar{\delta}/\rho g)$$

If the trim angle $\theta_T$ is set to the angle $\theta_w$ (for the case of minimum drag), the broaching relative to the keel line is obtained directly from Equation L.

Physical frictional effects and relative wave pattern variations as primary hump is approached requires further correction to the fence depth $\delta$ vs. x, particularly at the low Froude Numbers. This may be obtained experimentally for the given case or approximated by the following:

$$\bar{Z} = ZPC/\rho g \, (1 - (1/\pi)(1/F)^2)$$

$$x = (\bar{x}L/2)$$

$$\delta = (\bar{\delta}PC/\rho g) \, (1 - (1/\pi)(1/F)^2)$$

The number in parenthesis is an empirical correction factor obtained as an average condition relative to sub-scale model tests and need only be employed for the range $0.7 < F < 2$. Not employing the correction factor leads to a conservative sizing of the fence, which is also acceptable but results in slightly higher drag.

The embodiments outlined above will serve to produce an efficient minimum drag sidehull, improved inlet performance, improved directional stability and will also serve to eliminate sidehull broaching for a surface effect ship utilizing the same.

Sidehull drag is reduced due to reduced immersion and reduced wetted area. The major portion of the immersed surface of the sidehull of the instant invention, which due to its slenderness offers lower profile drag and due to its shaping offers a reduced wetted area.

Directional stability is improved since the sidehull of the instant invention offers less area forward of mid-cushion thereby requiring a smaller surface element aft or mid-cushion to provide the desired directional stability.

Surface effect ships are subject to an outboard directional shift of water streamlines particularly near the transom where the waterjet inlet is located, this is caused by the influence of cushion pressure. The anti-broaching fence 30 acts as a barrier and a directional vane which serves to straighten both the outboard and inboard streamlines. This action allows the water stream to remain essentially parallel to the surface of the anti-broaching fence 30 even if the surface effect ship experiences sideslip, as in a turning maneuver. The incoming flow relative to the inlet 26 is therefore very nearly longitudinal which approaches the ideal conditions. Referring now to FIGS. 3A and 3B, the outboard side of the sidehull is seen to exhibit a substantial elevation above the undisturbed water surface. The combination of the flat keel surface of the sidehull 32 and the anti-broaching fence 30 is such as to increase the static head at the inlet 26 even if a low immersion is experienced. The tendency of the streamlines approaching the inlet is to exhibit an upward component of velocity tending to improve inlet entrance conditions and reduce external lip cavitation at the inlet lip.

Broach free operation is achieved providing a barrier that is shaped consistent with the water depression at the sidewall, as offered by the instant invention. The cushion air is constantly sealed with pitch excursions since positive trim rotations are relative to the bow seal and negative trim rotations are relative to the stern seal, both cases resulting in increased immersion beyond the depression boundaries and therefore adequate sealing at the sidewalls.

Figure 9A:
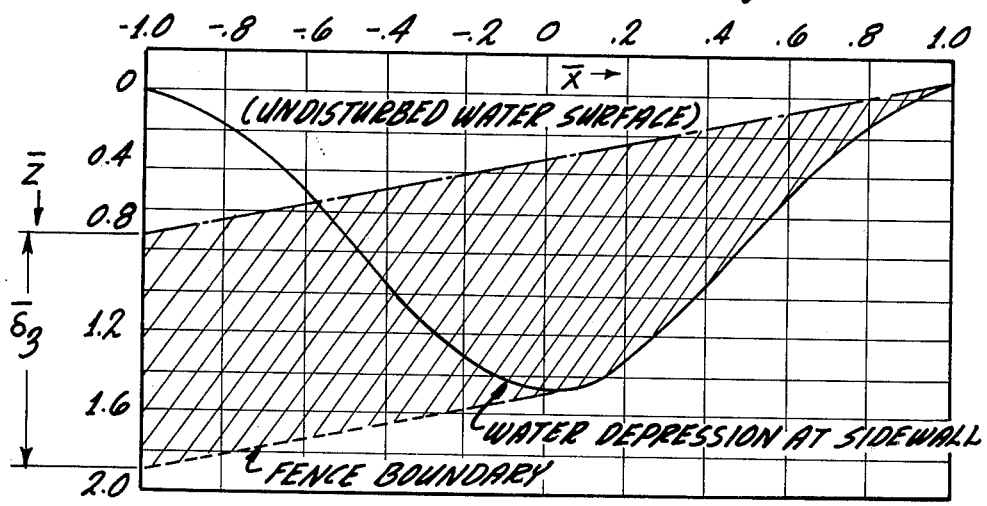
FIG. 9A is a graphical showing relating to the conversion from the dimensionless broaching contour into the required shape of the sidewall of the instant invention for a waterjet driven craft.
Figure 9B:
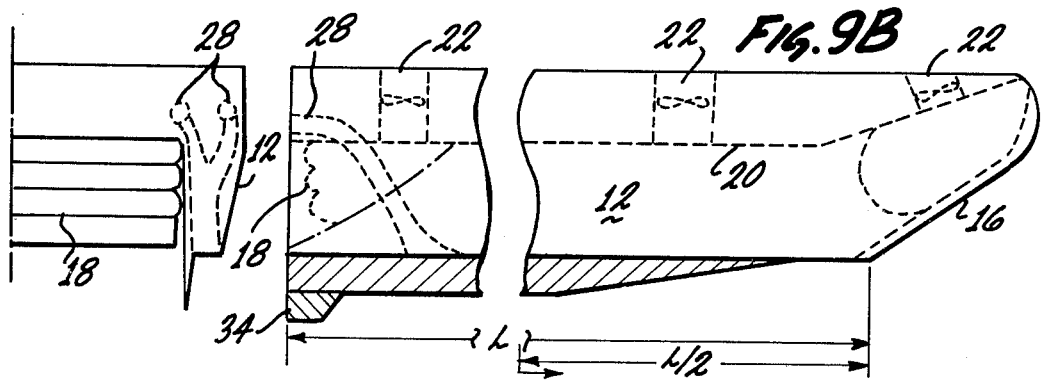
FIG. 9B is a sectional diagrammatic showing of the sidehull of a surface effect ship including dimensions relative to FIG. 11A.
Figure 10A:
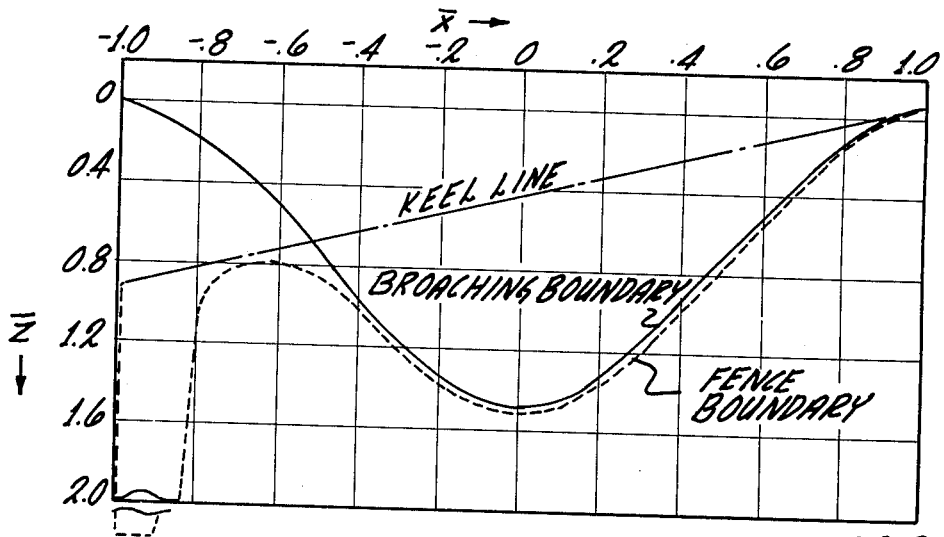
FIG. 10A is a graphic presentation of a dimensionless fence boundary of one embodiment of the invention.
Figure 10B:
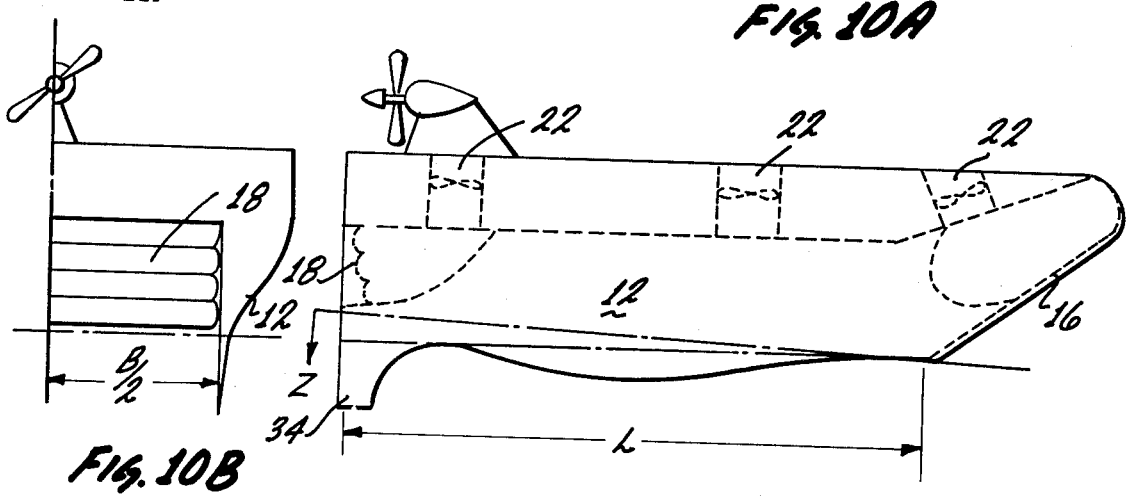
FIG. 10B is a partial end view and a side view of a surface effect ship sidehull shaping for utilizing the dimensionless representation taught by the graph of FIG. 12A.

FIGS. 9A and 9B provide an example of the convection from the dimensionless $\bar{z}$ vs. $\bar{x}$ broaching boundaries to a given fence shape of corresponding dimensional characteristics, for a waterjet propelled craft.

TABLE 1

| W (L.T.) | L (FT) | (L/B) Dimens. | P (PSFG) | F Dimens. | $\frac{P}{\rho g}$ (FT) | $\frac{P}{\rho g L}$ Dimens. | $0°$ f (DEG) | (FT) |
|---|---|---|---|---|---|---|---|---|
| 3300 | 191 | 2.25 | 455.3 | 1.94 | 7.114 | 0.0372 | 2.81 | 4.70 |
| 2800 | 191 | 2.25 | 386.3 | 1.94 | 6.036 | 0.0316 | 2.39 | 3.98 |
| 2240 | 191 | 2.25 | 309.1 | 1.94 | 4.829 | 0.0253 | 1.91 | 3.19 |
| 1792 | 191 | 2.25 | 247.2 | 1.94 | 3.863 | 0.0202 | 1.53 | 2.55 |
| 3300 | 224 | 2.60 | 393.5 | 1.803 | 6.148 | 0.0278 | 1.963 | 3.787 |
| 2240 | 221 | 2.60 | 267.1 | 1.803 | 4.174 | 0.0189 | 1.334 | 2.571 |

TABLE 1-continued

| W (L.T.) | L (FT) | (L/B) Dimens. | P (PSFG) | F Dimens. | P pg (FT) | P pgL Dimens. | 0° f (DEG) | (FT) |
|---|---|---|---|---|---|---|---|---|
| 1792 | 221 | 2.60 | 213.7 | 1.803 | 3.339 | 0.0151 | 1.066 | 2.057 |
| 3300 | 226 | 2.67 | 384.8 | 1.783 | 6.012 | 0.0266 | 1.844 | 3.637 |
| 2800 | 226 | 2.67 | 326.5 | 1.783 | 5.102 | 0.0226 | 1.567 | 3.087 |
| 2240 | 226 | 2.67 | 261.2 | 1.783 | 4.081 | 0.0181 | 1.255 | 2.469 |
| 1792 | 226 | 2.67 | 208.0 | 1.783 | 3.265 | 0.0144 | 0.998 | 1.975 |
| 3300 | 260 | 3.06 | 334.5 | 1.662 | 5.226 | 0.0201 | 1.313 | 2.979 |
| 2800 | 260 | 3.06 | 283.8 | 1.662 | 4.434 | 0.0171 | 1.117 | 2.527 |
| 2240 | 260 | 3.06 | 227.0 | 1.662 | 3.548 | 0.036 | 0.888 | 2.022 |
| 1792 | 260 | 3.06 | 181.6 | 1.662 | 2.838 | 0.0109 | 0.712 | 1.618 |

Figure 11:
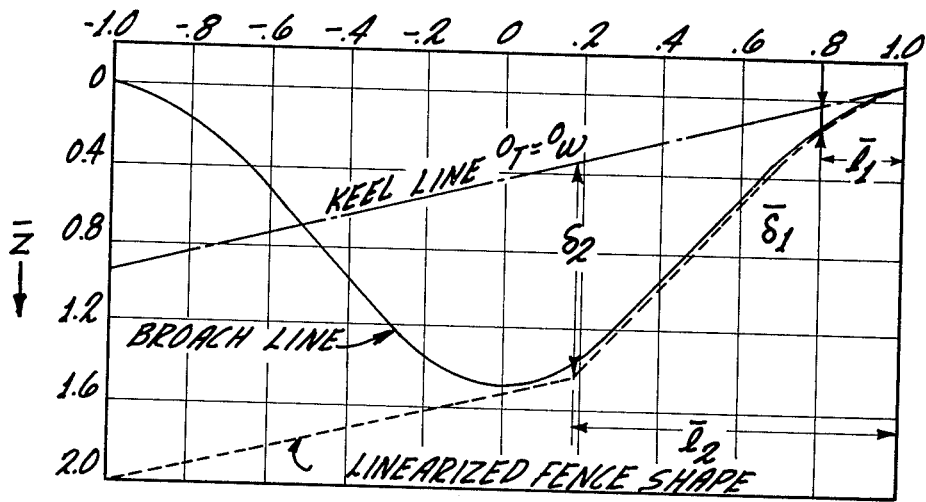
FIG. 11 is a graphic presentation of the nondimensional entry utilized for sizing examples of the invention from the data of Table I.

Table I provides an example of the above embodiments and the instant invention relative to a variety of surface effect ship geometries, gross weights and maximum speed (Froude Number) considerations, arranged as depicted by the dimensionless $\bar{z}$ vs. $\bar{x}$ as shown in the graph of FIG. 11.

Many changes may be made in the details of the instant invention, in the method and material of fabrication, in the configuration and assemblage of the constituent elements without departing from the spirit and scope of the appended claims, which changes are intended to be embraced therewith.

What is claimed is:

1. Improved anti-broaching sidehull fences for a surface effect ship designed to travel at high speed substantially over water surface, said surface effect ship having a stern transom, central supporting plenum chamber containing gas under pressure, said plenum chamber is defined by a pair of spaced apart rigid sidehulls with extending fences, a wet deck and bow and stern seals, the water surface below the plenum chamber being depressed below the undisturbed water surface due to the weight of the surface effect ship thereon comprising:

the water contacting surface of said sidehull fences extending downward from said sidehull at least from the bow seal to the transverse center line of said sidehull fences, the downward extending hull fence surface being substantially parallel and slightly below the depressed water surface when said surface effect ship is traversing said water surface at high speed whereby the gas under pressure is substantially confined to said central supporting plenum chamber and said sidehull fences provide minimum sealing drag within the water and the boundary of the sidehull fences relative to said undisturbed water surface is determined by the following equation:

$$\delta = \frac{PC}{\rho g}\left[0.77\cos\left(\frac{2\pi X}{L}\right) + 1.012\frac{X}{L} + 0.264\right]$$

wherein:

$$C = A\,k\,\sin^2\left(\frac{\pi}{2}\left(\frac{F_H}{F}\right)^{\frac{k}{2}}\right)$$

$$k = 3\cos\frac{\frac{L}{B}}{\sqrt{\frac{1}{\pi}} + \frac{2}{\pi}\left(\frac{L}{B}\right)} + 1$$

$$F_H = 0.025\,(L/B)/2 + \sqrt{\frac{1}{\pi}}$$

$$A = \pi\left[\left(1 - \left(\frac{F_H}{F}\right)\right)\sin\left(\frac{\pi(LB)}{\frac{L}{B} + 1}\right)\right] + 1$$

where

- B  Air plenum (cushion) beam (FT)
- g  Acceleration of gravity=32.174 (FT/SEC$^2$)
- L  Air plenum (cushion) length (FT)
- P  Air plenum (cushion) pressure (PSFG)
- X  Reference axis in the direction of motion with the origin at the center of pressure of the cushion planform area (mid-cushion for a rectangular pressure patch) (FT)
- $\rho$  Density of water=1.99 (Slugs/FT$^3$)
- C  Resistance (wave drag) coefficient$\equiv(\rho g R/p^2 B)=(\rho g/P)(z_{Save}-z_{Bave})$
- $\bar{\delta}$  Required dimensionless depth of instant invention$\equiv\rho g/PC$
- F  Froude Number based on the cushion length
- $F_H$  Froude Number at primary hump.

2. The invention as defined in claim 1, wherein said sidehull fences extend downward from said stern seals to said transverse center line.

3. The invention as defined in claims 1 or 2, wherein the downward extending surface of the sidehull fence is rectilinear.

4. The invention as defined in claims 1 or 2, wherein the downward extending surface of the sidehull fence is curvilinear.

* * * * *